June 6, 1944.  R. CARPENTER  2,350,492
STEAM JOINT
Filed Dec. 2, 1942  2 Sheets-Sheet 1

INVENTOR
RUSSELL CARPENTER
ATTORNEYS

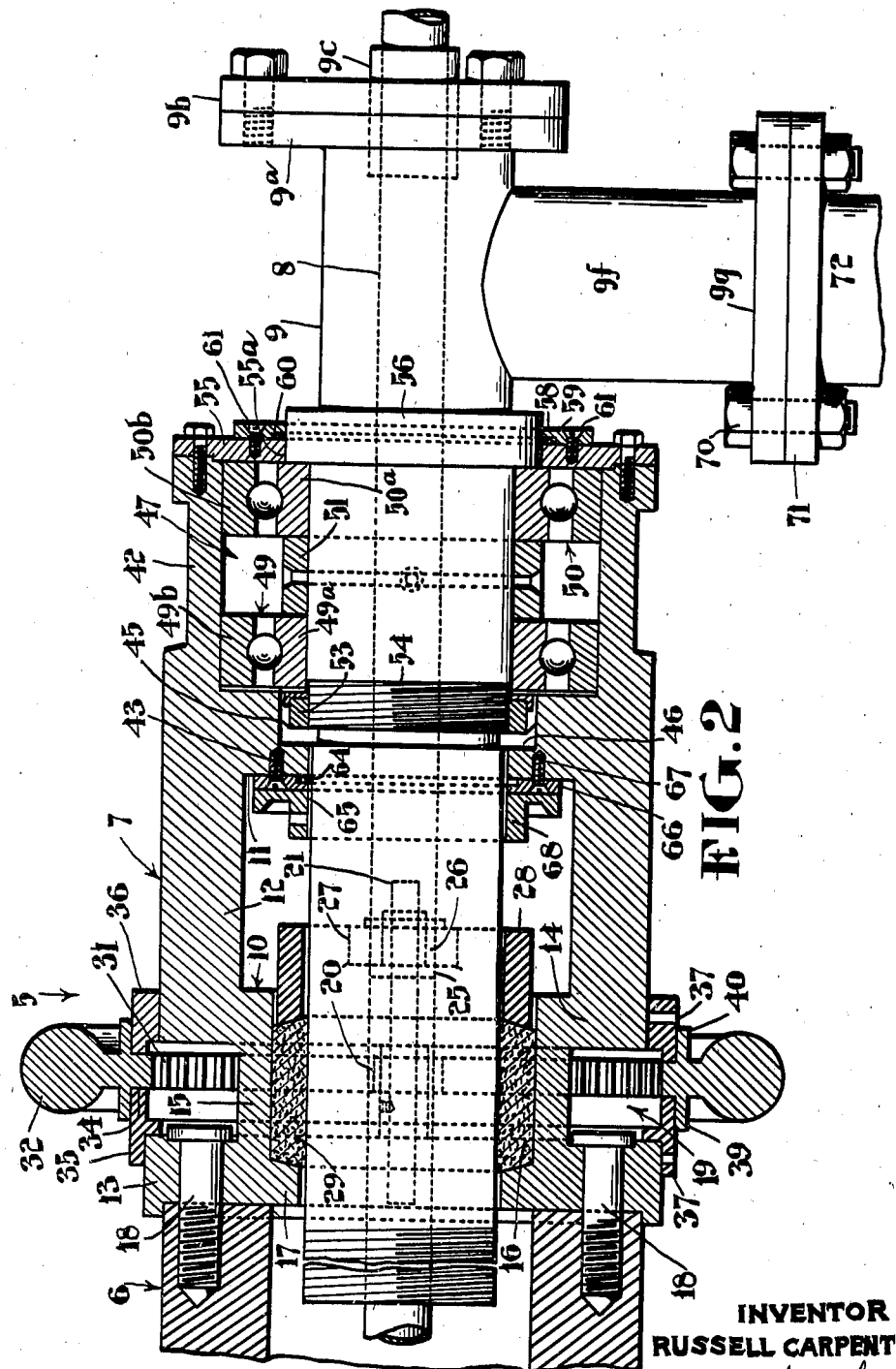

Patented June 6, 1944

2,350,492

UNITED STATES PATENT OFFICE 2,350,492

STEAM JOINT

Russell Carpenter, Three Rivers, Quebec, Canada

Application December 2, 1942, Serial No. 467,655

3 Claims. (Cl. 285—10)

This invention relates to steam joints for steam heated cylinders or rolls employed in the papermaking and other industries.

The principal object is to provide an improved steam joint assembly in which the stationary and rotating parts are assembled in a novel manner which reduces loss of steam due to leakage and which results in a substantially reduced dragging or braking effect being imposed on the steam heated roll or cylinder compared with the steam joints now in use.

Another object is to provide a steam joint assembly in which anti-friction bearings are interposed between the stationary and rotating parts and in which novel means are provided for preventing leakage of steam into contact with said bearings.

A further object is to provide a steam joint assembly which, in addition to the above mentioned desirable characteristics, is of simple and rugged construction.

Other objects, advantages and characteristic features of the invention will be more readily understood from the following description of the accompanying drawings, in which—

Fig. 2 is a longitudinal sectional view of the assembly shown in Fig. 1.

Figure 1:
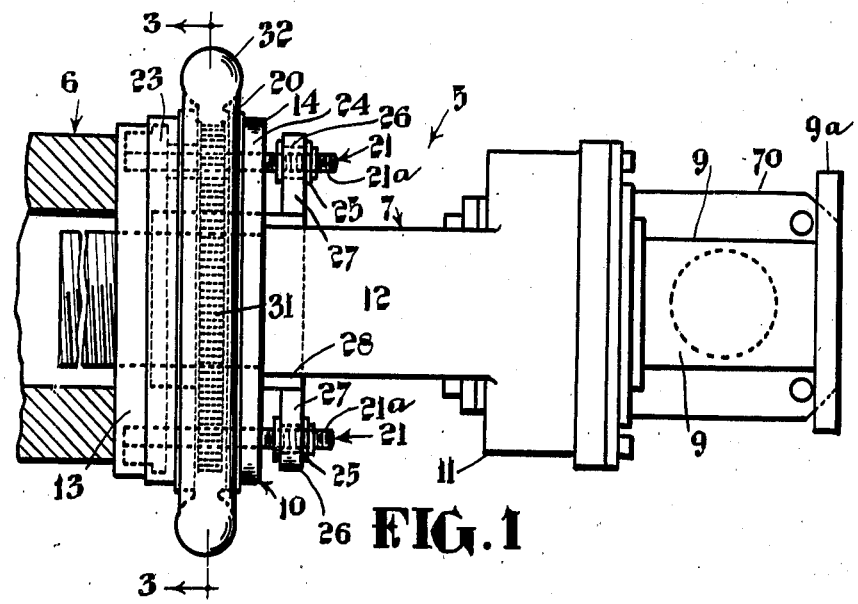
Fig. 1 is an elevational view of my improved joint assembly applied to the journal of a steam heated roll or cylinder.
Figure 3:
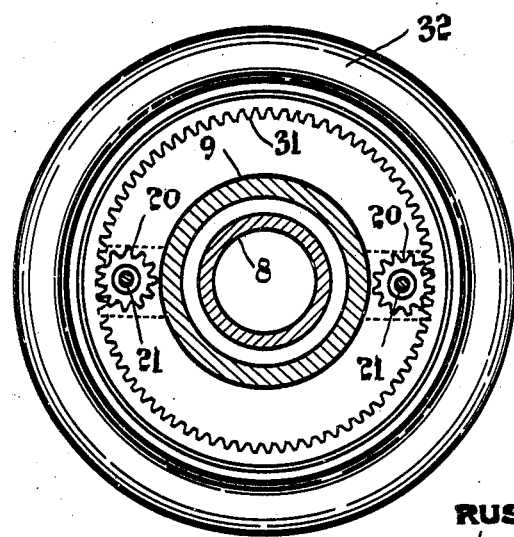
Fig. 3 is a transverse sectional view taken along the line 3—3 of Fig. 2.

In these drawings my improved joint assembly is generally indicated at 5 and is shown attached to a journal 6 representing one of the journals of a steam heated roll or cylinder.

As here shown, my improved joint assembly comprises a rotating casting 7 through which extends a stationary condensate pipe 8 and a stationary steam supply pipe 9, the condensate pipe being arranged inside the steam supply pipe and the inner ends of both of said pipes being extended inwardly through the roll journal 6 in the usual manner.

The casting 7 includes co-axial hollow end sections 10 and 11 spaced apart by connecting arms 12 cast integral therewith.

The end section 10 is a stuffing box section presenting spaced flanges 13 and 14 projecting outwardly from opposite ends of a tubular connecting web 15 which forms the annular wall of a stuffing box 16 having a centrally apertured end wall 17 through which the steam supply pipe 9 extends, said wall 17 being formed by a flange projecting inwardly from the outer end of web 15.

The flange 13 is fastened to journal 6 by stud bolts 18 and forms, with the flange 14 and web 15, an annular groove or channel 19 containing a pair of pinions 20 fixed to diametrically opposed screw shafts 21 journalled in bearing openings 22 and 23 provided in flanges 13 and 14. Screw threaded portions 21a of shafts 21 project outwardly through the bearing openings 23 and have sleeves 25 threaded thereon. The sleeves 25 are rotatably secured in openings 26 provided in lugs 27 projecting outwardly from a packing gland 28 which is fitted in the open end of the stuffing box 16 and serves to compress the packing material 29 which is arranged in the stuffing box in sealing contact with the outer surface of the stationary steam supply pipe 9. The pinions 20 mesh with a ring gear 31 which is fitted in the channel 19 and is carried by a rotatably mounted hand wheel 32. The ring gear 28 works in a guide slot 34 formed by and between the inner side edges of two channel covering guide rings 35 and 36 which are fastened by studs 37 to the outer peripheral edges of flanges 13 and 14 so that they overlie the channel 19. The hand wheel 32 is provided with oppositely directed bearing flanges 39 and 40 which ride the outer surface of rings 35 and 36.

As hereinafter explained the hand wheel 32, ring gear 31, pinions 20 and sleeves 23 provide accessible and convenient means for adjusting the packing gland 29 while the casting 7 is rotating with journal 6.

The end 11 of casting 7 constitutes a bearing housing section 47 including a circumferential wall 42 and an inner end wall 43, the latter being provided with a central opening 45 for the passage of the steam supply pipe 9 and with a recess 46 formed in the side thereof facing the open end of the bearing housing 47.

That portion of steam supply pipe 9 which extends through bearing housing 47 is supported by two anti-friction bearings 49 and 50 and are maintained in spaced relation by an interposed spacing ring 51 secured to said pipe. The bearing 49 is arranged between the spacing ring 51 and the end wall 43 of housing 47, and its inner race 49a is clamped against the adjacent side of the spacing ring by a clamping nut 53 which is screwed onto a threaded portion 54 of pipe 9. The bearing 50 is arranged between the spacing ring 51 and an end plate 55 closing the outer end of bearing housing 47, the inner race 50a of bearing 50 being confined between the spacing ring 51 and an outwardly projecting annular shoulder 56 of steam supply pipe 9, said shoulder 56 being fitted in a central opening 55a of end plate 55 and being engaged by packing material 58 fitted in a race 59 of a sealing ring 60 which is fastened to the outer side of plate 55 by screws 61. The outer races 49b and 50b of bearings 49 and 50 are slidable on the inner surface of wall 42 of bearing housing 47 to permit limited relative axial movement between pipe 9 and casting 7, it being noted that bearings 49 and 50 are arranged in bearing housing 47 with sufficient clearance to permit these bearings to move relative to the end wall 43 and end plate 55 of said housing.

Leakage of stem into bearing housing 47 through the central opening 45 of wall 43 is prevented by a sealing member 64 which is fitted in a groove 65 provided in a sealing ring 66 which is fastened by screws 67 to the outer side of said wall 53. A steam deflecting ring 68 is arranged adjacent the outer side of sealing ring 66 and also serves to deflect steam away from the aforesaid opening 45.

The outer end of pipe 9 which projects beyond shoulder 56 is provided with a flange 9a to which a cover plate 9b is secured, said cover plate being provided with a central nipple 9c through which the outer end of the condensate pipe 8 is extended to any suitable condensate discharge point. Between the shoulder 56 and the flange 9a, the pipe 9 is provided with a laterally directed steam inlet 9f having a flange 9g which is bolted, as at 70, to the flange 71 of a main steam supply conduit 72.

A steam joint constructed as described herein is characterized by a number of advantageous features. The interposition of the anti-friction bearings 49 and 50 between the rotating casting 7 and the stationary steam supply pipe 9 reduces the dragging or braking effect of the joint assembly on the journal of the roll or cylinder to which it is applied. The manner in which the bearings 49 and 50 are enclosed in the bearing housing 47 is an important feature in that it reduces the possibility of steam leaking into contact with and damaging these bearings. The possibility of steam leaking into contact with these bearings is further minimized by the provision of the stuffing box 16 containing the packing 29 which effectually prevents outward leakage of steam along the outer surface of the pipe 9 in the direction of the bearing housing 47. Such steam as may seep past the stuffing box 16 is prevented from entering the bearing housing 47 by the sealing material 64 and the steam deflecting ring 68.

Another advantage of the construction described herein is that the removal of the plate 55 closing the outer end of the bearing housing 47 permits the pipe 9 and the bearings 49 and 50 to be removed as a unit by simply sliding these parts to the right after the pipe 9 has been disconnected from the main steam supply conduit 72.

A further advantage of the construction described herein is that when the casting 7 is rotating with the journal 6 and it is desired to tighten the packing gland 28, this may be accomplished in a simple and convenient manner by merely holding the normally revolving hand wheel 32 stationary for a sufficient period of time so that the resulting rotation of the traveling pinions 20 will act through the screw shafts 21 and sleeves 25 to force the gland 28 against the packing material 29.

Having thus described what I now conceive to be the preferred embodiment of this invention, it will be understood that various modifications may be resorted to within the scope and spirit of the appended claims.

Having thus described my invention, what I claim is:

1. A steam joint assembly of the character described including a stuffing box having a centrally apertured wall at one end thereof, means for securing said stuffing box to a journal of a rotatable steam heated roll or cylinder whereby said stuffing box is adapted to be rotated with said journal, a stationary steam pipe extending through said stuffing box, a packing gland encircling said pipe and slidably fitted in the end of the stuffing box remote from said centrally apertured end wall, a ring gear rotatably carried by said stuffing box, pinion shafts rotatably journalled in bearings carried by said stuffing box and equipped with pinions meshing with said ring gear and means connected between said pinion shafts and said packing gland for adjusting the latter in response to rotation of the pinion shafts about their axes.

2. A steam joint assembly as set forth in claim 1 including a bearing housing rigidly attached to said stuffing box and provided with end walls having openings through which said steam pipe extends, anti-friction bearings arranged in said bearing housing with the inner races of the bearings carried by said pipe and the outer races engaging a wall of the bearing housing which encircles said pipe and means for sealing the end openings of the bearing housing through which said pipe extends.

3. A steam joint assembly of the character described including a stuffing box entirely open at one end and having the opposite end partially closed by an end wall provided with a central opening for the passage of a steam pipe, means for rigidly securing said stuffing box to a journal of a rotating steam heated roll or cylinder whereby said stuffing box is supported by said journal to rotate therewith, a stationary steam supply pipe extending through said stuffing box, a packing gland encircling said steam pipe and slidably fitted in the open end of the stuffing box, packing material arranged in the stuffing box between the centrally apertured end wall thereof and said packing gland, said stuffing box being provided with an outwardly opening annular channel extending around the outer surface thereof, an internal ring gear fitted in said channel and rotatably carried by said stuffing box, pinion shafts rotatably journalled in bearings provided in the side walls of said channel, pinions fixed to said pinion shafts and meshing with said ring gear and connections between said pinion shafts and said packing gland whereby the latter is shifted to different positions of adjustment in response to rotation of the pinion shafts about their axes.

RUSSELL CARPENTER.